Jan. 27, 1959     L. E. ROBERTS ET AL     2,870,687
CONTOURING MACHINE

Filed Aug. 6, 1956     2 Sheets-Sheet 1

INVENTORS.
LEONARD E. ROBERTS,
EVERETT EVENSON,

BY Thomas P. Maloney
ATTORNEY.

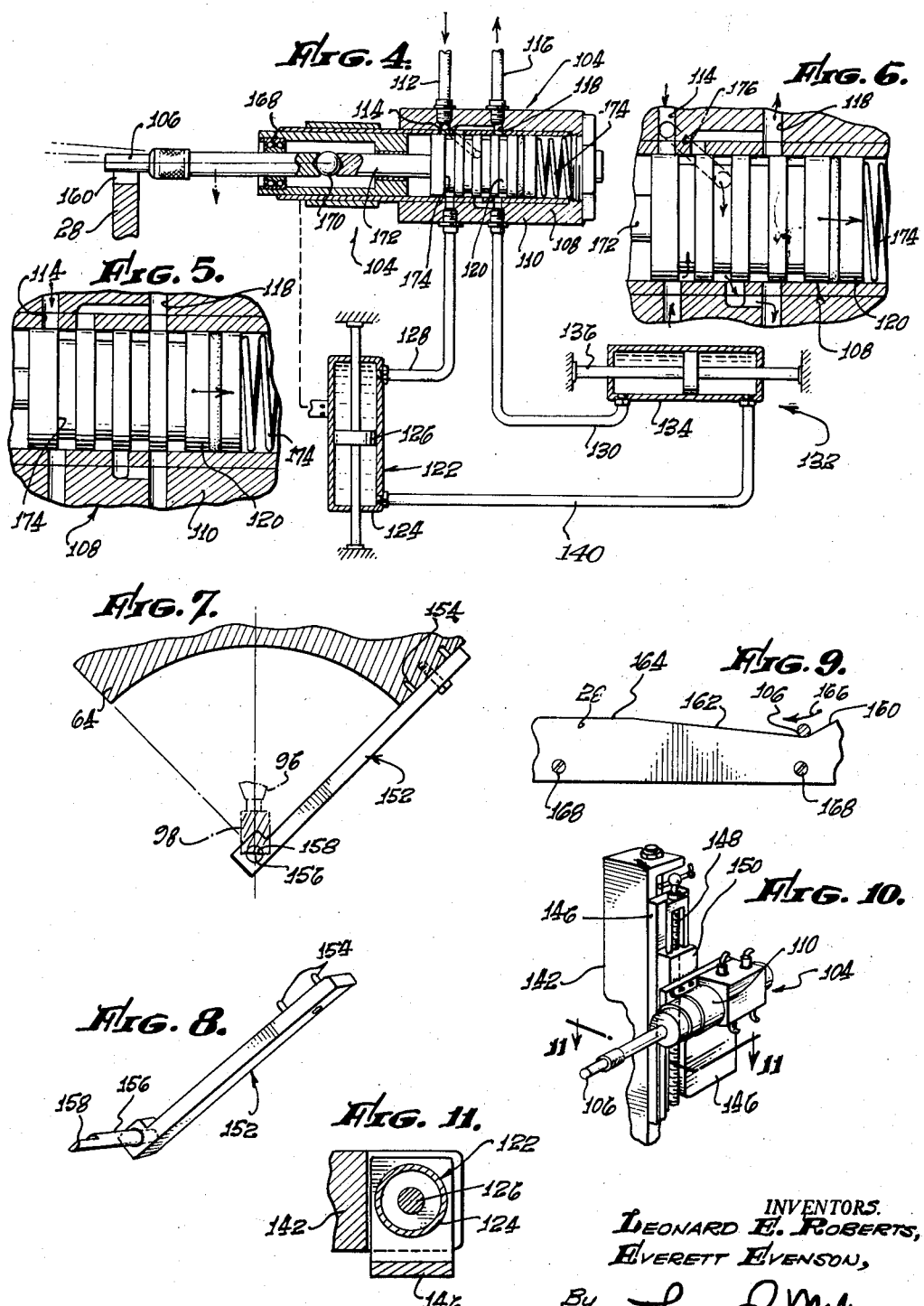

United States Patent Office 2,870,687
Patented Jan. 27, 1959

2,870,687

CONTOURING MACHINE

Leonard E. Roberts, Los Angeles, and Everett Evenson, Glendale, Calif., assignors to American Tapered Wings, Inc., Los Angeles, Calif., a corporation of California Application August 6, 1956, Serial No. 602,166

5 Claims. (Cl. 90—13)

This invention relates to a contouring machine and, more particularly, to a machine of that character whose primary function is the forming of contours in work pieces while simultaneously forming said contours at various desired angles.

While our invention has particular application in the forming of contours in elongated work pieces and simultaneously forming angles in said contours, it is, of course, not intended that the invention be limited in its use to the formation of such angles and contours since it can be readily used in other conventional applications.

In the relatively recent past, it has become necessary to form various relatively complex contours in work pieces of relatively great length, such as wing spars and the like, and the problem of forming contours in such elongated bodies has been complicated by the necessity for simultaneously forming angles on said contours during the formation of said contours.

In an attempt to simultaneously form such angled contours, various expedients have been resorted to, among them being the twisting of the work piece within its elastic limits where the angle was uniformly progressive along the length of the contour being formed but, of course, such expedients are not successful where it is necessary to form angles which have no direct relationship with the position of the angle along the length of the contour being formed.

It is, therefore, an object of our invention to provide a contour forming machine which includes a rotatable contouring head disposed in operative relationship with a work supporting table movable in a longitudinal plane, the contouring head being automatically controlled, in a manner to be described in greater detail below, to simultaneously form a contour and an angle on the contour at the same rate as it takes conventional machines to form a simple contour.

Another object of our invention is the provision of a machine of the aforementioned character wherein the contour and the angle thereof are determined by the posiltion of a rotatable contouring head and wherein the position of the contouring head itself is attributable to the utilization of pattern tracing means associated with a pattern which determines the angular orientation of the contour being formed upon the work piece.

An additional object of our invention is the provision of a contouring machine of the aforementioned character wherein the pattern tracing means is operatively connected to first displaceable means which, in turn, is connected to second displaceable means, said first and second displaceable means being constituted by any type motor and, in the present instance, constituted by first and second hydraulic motors of the rectilinear, piston-cylinder type, the displacement of the cylinder of the first displaceable means causing concomitant displacement of the cylinder of the second displaceable means whereby, through an operative connection with the contouring head, the movement of the cylinder of the second displaceable means is communicated to said contouring head to cause said contouring head to assume the angle which is established by the pattern engaged by the pattern tracing means.

A further object of our invention is the provision of a contouring machine of the aforementioned character wherein the pattern tracing means is mounted upon the cylinder of the first hydraulic motor whereby, when the pattern tracing means causes displacement of the cylinder to cause concomitant displacement of the cylinder of the second hydraulic motor with which it is operatively connected, simultaneous displacement of the pattern tracing means will be accomplished in order that the pattern tracing means may be restored to its inoperative condition until it detects a variation in the pattern which will cause it to deliver hydraulic fluid to either the first or second hydraulic motors associated therewith.

Other objects and advantages of our invention will be apparent from the following specification and the accompanying drawings which are for the purpose of illustration only and in which:

Fig. 4 is an enlarged, schematic, sectional view of the major operating components of the contouring machine of our invention;

Fig. 5 is an enlarged, fragmentary view of the tracing valve incorporated in the tracing means thereof;

Fig. 6 is an enlarged, fragmentary view similar to that of Fig. 5, but showing the valve in a different position therefrom;

Fig. 7 illustrates a tool utilized in adjusting the contouring head to the proper angle;

Fig. 8 is a perspective view of the tool;

Fig. 9 is a side elevational view of a typical pattern taken on the broken line 9—9 of Fig. 1;

Fig. 10 is an enlarged, fragmentary view illustrating the adjustment means for the tracer means of the invention; and Fig. 11 is a transverse, partly sectional view taken on the broken line 11—11 of Fig. 10.

Figure 1:
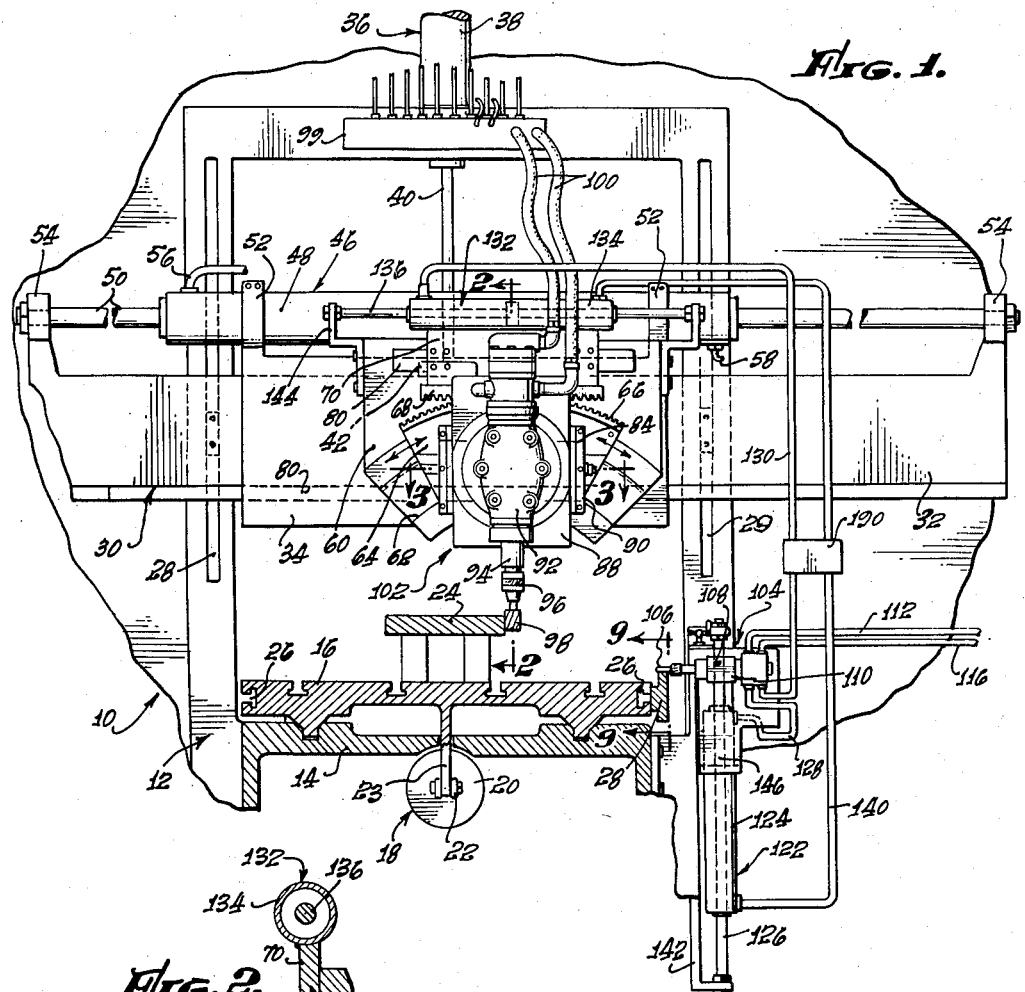
Fig. 1 is a front elevational view of the major components of the contouring machine of our invention.

Referring to the drawings and particularly to Fig. 1 thereof, we show a contouring machine 10 constructed in accordance with the teachings of our invention and including a relatively massive supporting frame 12, said supporting frame encompassing and mounting an elongated bed 14 disposed in a horizontal plane and providing a support for a work supporting table 16.

Disposed beneath the bed 14 of the machine 10 is a hydraulic motor 18 which includes a cylinder 20 mounting a piston rod 22, the outer extremity of said piston rod being connected to the longitudinally movable work piece supporting table 16 by means of a connecting arm 23. Therefore, as the piston rod 22 is extended from or retracted into the cylinder 20 of the hydraulic motor 18, corresponding longitudinal movement of the work piece supporting table 16 on the bed 14 takes place, thus causing longitudinal movement of a work piece 24 which is secured by conventional means to the upper surface of the longitudinally movable table 16.

Formed in the opposite edges of the table 16 are pattern supporting means 26 constituted by elongated grooves in said edges, a vertically oriented pattern 28 being mounted in the righthand one of said grooves and having formed in plan thereupon, as will be adverted to hereinbelow, the angle pattern for a contour to be formed in the work piece 24.

Mounted upon the frame 12 of the contouring machine 10 by means of ways 29 is a contour cutting head supporting carriage 30 which includes a vertically moving component 32 and a horizontally moving component 34, said horizontally moving component 34 being mounted for transverse movement upon the vertically moving component 32.

Supported upon the upper extremity of the frame 12 of the contouring machine 10 is a hydraulic motor 36 incorporating a cylinder 38 and an extensible-retractible piston rod 40, the lower extremity of said piston rod being connected at 42 to the upper edge of the vertically moving component 32 of the carriage 30. Therefore, when hydraulic fluid is fed to the cylinder 38 to cause upward or downward vertical movement of the vertically moving component 32 of the carriage 30, the entire carriage 30 is shifted vertically in the appropriate direction.

A hydraulic motor 46 including a cylinder 48 and a piston rod 50 is utilized to cause transverse movement of the horizontally movable component 34 of the contour head supporting carriage 30. The cylinder 48 is operatively secured to the horizontally movable component 34 of the carriage 30 by means of brackets 52, while the opposite extremities of the piston rod 50 are operatively secured to bosses 54 extending upwardly from the opposite extremities of the vertically movable component 32 of the carriage 30. Hydraulic fluid is fed from a source, not shown, into the cylinder 48 by means of flexible hydraulic lines 56 and 58 and, therefore, when fluid is fed into the cylinder 48 by an appropriate control means of conventional character, the cylinder 48 will traverse the fixed piston rod 50 causing translation of the horizontally movable component 34 of the carriage 30 upon the vertically movable component thereof.

Operatively secured to the horizontally movable component 34 of the carriage 30 is a mounting plate 60, said mounting plate being provided at its lower extremity with arcuate ways 62 and being oriented in a vertical plane. Operatively engaged in the ways 62 and rotatable in an arc therein, is a quadrant-shaped table 64, said table having an arcuate gear segment 66 provided upon the upper extremity thereof and engageable by a horizontally reciprocable rack 68 which is mounted on a carrier 70 guided in ways 80 on the mounting plate 60.

Figure 3:
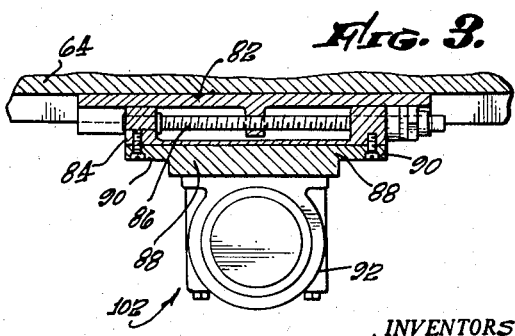
Fig. 3 is a transverse, sectional view taken on the broken line 3—3 of Fig. 1.

Secured to the base of the rotatable table 64 by means of dovetail guide means 82 is a sub-carrier 84, said sub-carrier being transversely adjustable of the rotatable table 64 by means of a micrometer screw adjustment 86. A vertically adjustable mounting plate 88 is secured to the sub-carrier 84 by means of locating bars 90, as best shown in Figs. 1 and 3 of the drawings, to maintain a hydraulic motor 92 secured to the mounting plate 88 in a predetermined position of vertical adjustment. The hydraulic motor 92 is provided with a spindle 94 having a chuck 96 in which may be mounted a milling cutter 98, or other appropriate tool. The hydraulic motor 92 is connected, as best shown in Fig. 1 of the drawings, to a hydraulic header 99 by means of flexible hydraulic lines 100. Therefore, when fluid under pressure is fed to the hydraulic motor 92 through the lines 100 from the header 99, rotation of the spindle 94 in the desired direction and consequent rotation of the cutter 98 or other tool mounted in the chuck 96 will take place.

It will thus be readily apparent that among the components of the contouring machine constituting the rotatable contouring head of said machine are the quadrant-shaped table 64 and the arcuate gear segment thereupon, the sub-carrier 84, the mounting plate 88, and the hydraulic motor 92. Of course, the provision of the arcuate ways 62 in the mounting plate 60 permits movement of the contouring head, which is indicated generally at 102, in an arcuate path and in a manner which will be described in greater detail below.

It should be clear at this juncture that transverse reciprocation of the rack 68 will cause concomitant movement or rocking of the gear segment 66 which, in turn, will cause movement of the table 64 in the arcuate ways 62 of the mounting plate 60 to rotate the contouring head 102 and the motor 92 constituting a part of the same about its axis of rotation in order to form an angular cut on the work piece as the hydraulic motor 18 causes longitudinal translation of the work piece supporting table 16 which causes the work piece 24 to be carried past the milling cutter 98. It should be noted that, as the work piece 24 is translated past the milling cutter 98 by longitudinal movement of the work piece supporting table 16 on the bed 14, the vertically and horizontally movable components 32 and 34, respectively, of the carriage 30 can be, respectively, moved up and down and to the right or left, as previously described, under the influence of conventional controls, not shown, to determine the basic contour and depth of contour formed in the work piece as the rotatable contouring head 102 is rotated about its axis to determine the angularity of the contour that is formed during the movement of the carriage 30.

Located adjacent the path of movement of the horizontally movable work supporting table 16 is tracing means indicated generally at 104, said tracing means including a tracing finger 106 which is adapted, in a manner to be described in greater detail below, to energize a conventional tracer valve 108 which is mounted in a housing 110. A flexible, pressure fluid supply line 112 is connected to the inlet port 114 of the housing 110 and a return line 116 is connected to the outlet port 118 thereof, as best shown in Figs. 4–6 of the drawings. While the tracer valve 108 is shown as including a longitudinally reciprocable piston 120, it is, of course, not intended to limit the concepts of the invention to the particular type of tracer valve or tracing means shown since there is a wide variety of different types of tracing means available on the market at the present time.

Operatively associated with the tracing means 104 is a first displaceable means 122, said first displaceable means being constituted, in the present embodiment, by a hydraulic motor including a movable hydraulic cylinder 124 operatively associated with a piston-piston rod combination 126. A power line 128 is connected between the tracer valve 108 and the upper extremity of the cylinder 124 so that hydraulic fluid fed into the upper extremity of the cylinder through the flexible power line 128 will cause vertical displacement of the cylinder 124 because the opposite extremities of the piston-piston rod combination 126 are secured against movement in a manner which will be described in greater detail below.

Another power line 130 from the tracer valve 108 is connected to the left-hand end of second displaceable means 132 constituted by a hydraulic motor including a movable hydraulic cylinder 134 mounted for movement relative to a fixed piston-piston rod combination 136. The lower extremity of the cylinder 124 and the right-hand end of the cylinder 134 are operatively connected to each other by means of a hydraulic line 140.

Figure 2:
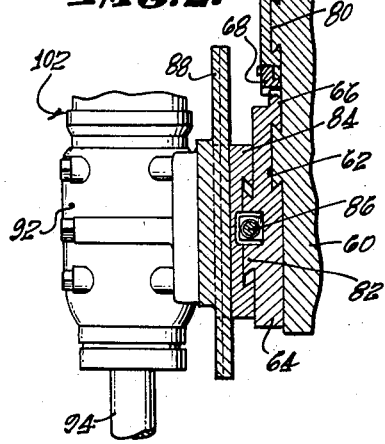
Fig. 2 is a vertical, sectional view taken on the broken line 2—2 of Fig. 1.

The piston 126 has its opposite ends fixedly mounted in a bracket 142 secured to the frame 12 of the contouring machine 10 at a point directly opposite the point of engagement of the milling cutter 98 with the work piece 24. The opposite extremities of the piston rod 136 are secured to the mounting plate 60 in brackets 144 and the cylinder 134 is mounted thereupon for movement relative thereto, said cylinder being operatively connected to the carrier 70 by means of welding, or the like, as best illustrated in Figs. 1 and 2 of the drawings.

The tracing means 104 is operatively mounted upon the vertically movable cylinder 124 constituting the first displaceable means 122 by means of a mounting arm 146 which rides against the bracket 142 and which is provided with a screw adjustment means 148 adapted to adjust a carriage 150 upon which the tracing means 104 is actually mounted, as best shown in Fig. 10 of the drawings, to properly adjust the tracing finger 106 with reference to the pattern 28 in order that the contouring head 102 may be properly located, while the tracing means 104 can be vertically oriented without, in any way, affecting or energizing either one of the hydraulic motors 122 or 132.

Shown in Figs. 7 and 8 of the drawings is the use of a locating tool 152 in conjunction with the quadrant-shaped table 64. The locating tool 152 is provided with pins 154 engageable in the side of the quadrant-shaped table 64 and mounts a rotatable gage pin 156 having a land 158 thereupon. Therefore, as best illustrated in Fig. 7 of the drawings, when it is desired to adjust the housing of the motor 92 vertically or horizontally on the sub-carrier 84 with reference to the quadrant-shaped table 64, the locating tool 152 is mounted in the manner shown in Fig. 7 of the drawings on the quadrant-shaped table 64 and the proper adjustments of the sub-carrier 84 made until the milling cutter 98, or other tool, mounted in the chuck 96 assumes the desired relationship with the gage pin 156 and, more particularly, with the land 158 thereupon.

Shown in Fig. 9 of the drawings is a typical pattern 28 as mounted by means of bolts 168, or the like, in the groove 26 on the side of the longitudinally movable table 16, said pattern, when moving in the direction of the arrow 166, having fall portions 160, rise portions 162, and dwell portions 164 engageable, successively, by the tracing finger 106 of the tracing means 104. When the tracing finger 106 engages a fall portion 160 of the cam provided by the pattern 28, the contouring head 102 will be rotated in the appropriate direction, and when the rise 162 is engaged, the direction of rotation will be reversed, engagement with the dwell 164 preventing energization of the tracing means 104 and preventing rotation of the contouring head 102.

The tracing finger 106 is, as best shown in Fig. 4 of the drawings, mounted in a spherical bearing 168 in an extension of the housing 110 and engages a ball 170 which transmits longitudinal motion to a rod 172 connected to the piston 120. The piston 120 is biased to the left by means of a compression spring 174, therefore, when a fall portion 160 of the cam constituting the pattern edge of the pattern 28 is encountered, the piston 120 is urged to the left and the rod 172 through the ball 170 urges the finger 106 downwardly permitting hydraulic fluid under pressure to flow through the line 112, past the ring 175 in the piston 120 and into the line 128 which will force the cylinder 124 upwardly with respect to the piston and piston rod 126 expelling fluid from the lower end of the cylinder 124 through the line 140 into the right-hand end of the cylinder 134 and urging said cylinder to the right to cause movement of the rack and thus the quadrant-shaped table 64 to the right and rotating the milling cutter 98 to the left, as best shown in Figs. 1 and 4 of the drawings.

As fluid under pressure is fed from the lower extremity of the cylinder 124 into the right-hand end of the cylinder 134, hydraulic fluid is discharged from the left-hand end of the cylinder 134 into the line 130 and through the valve 108 to the return line 116.

Of utmost importance is the fact that, as the cylinder 124 is moved upwardly, it carries the tracing means 104 upwardly to cause the tracing finger 106 to return to the position shown in Fig. 5 of the drawings wherein the piston 120 prevents flow of pressure fluid through the valve 108 and thus locks the contouring head 102 in position.

On the other hand, when the finger 106 is deflected upwardly by engagement with the rise 162 of the pattern 28, the upward movement of the finger 106 causes inward shifting of the rod 172 and the piston 120 against the bias of the spring 174, causing the flow of fluid from the inlet port 114, as best illustrated in Fig. 6 of the drawings, through the passage 176 and into the pressure line 130 to cause the cylinder 134 to move to the left and to expel fluid from the right-hand end of said cylinder into the lower extremity of the cylinder 124 which causes the downward movement of the cylinder 124 and carries the tracing means 104 downwardly therewith to return the tracing finger 106 to the neutral position.

Located across the lines 130 and 140 is a reversing valve 190 whereby flow of fluid from the tracing means 104 and the cylinder 124 to the cylinder 134 can be reversed, thus permitting the utilization of the identical pattern 28 for cutting angles whose contours are the reverse of that cut by the use of the same pattern prior to the energization of the reversing valve.

We thus provide by our invention a contouring machine and, more particularly, a contouring head therefor which is adapted to automatically form a predetermined angle upon a contour being cut by the use of the machine and to form said angle by the utilization of a tracing means which reads a pattern and which imparts a signal to first and second displaceable means constituted by first and second hydraulic motors. Thus, the necessity for bending the work piece in order to achieve an angle upon the contour being cut or the use of more complex, expensive means is eliminated with the resultant savings and accuracy not achieved by prior art methods.

We claim as our invention:

1. In a device for forming contours in a work piece, the combination of: a mounting frame; a contouring head mounted for arcuate movement on said frame; a longitudinally movable work piece supporting table on said frame below said head; pattern mounting means on said table; a pattern on said mounting means; a first motor fixedly attached to said frame having a portion movable with respect to said frame; a control mounted on said movable portion of said first motor, said control having a tracing finger and a control member responsive to deflection of said tracing finger, said first motor being connected to said control whereby, when said tracing finger is deflected by said pattern, the movable portion of said first motor is moved to return said tracing finger to its original position; a second motor fixed to said frame and having a movable portion connected to said contouring head to cause arcuate movement thereof, said second motor being connected to said first motor so that displacement of the movable portion of said first motor is accompanied by corresponding displacement of said second motor and said second motor being connected to said control; and a source of power connected to said control whereby movement of the movable portions of said first and second motors is accomplished.

2. In a device for forming contours in a work piece, the combination of: a mounting frame; a contouring head mounted for arcuate movement on said frame; a longitudinally movable work piece supporting table on said frame below said head; pattern mounting means on said table; a pattern on said mounting means; a first hydraulic motor having a portion fixedly attached to said frame and a portion movable with respect to said frame; a valve mounted on said movable portion of said first motor having a tracing finger and a valve member responsive to deflection of said tracing finger, said first motor being connected to said valve, whereby, when said finger is deflected by said pattern, said movable portion of said first motor is moved to return said finger to its original position; a second hydraulic motor having a portion fixed to said frame and a movable portion secured to said contouring head to arcuately move said head, said first and second motors being connected directly to each other and said second motor being connected directly to said valve; and a source of hydraulic fluid under pressure and connected to said valve for delivery to either of said motors.

3. In a device for forming contours in a work piece, the combination of: a mounting frame; a contouring head mounted for arcuate movement on said frame; a longitudinally movable work piece supporting table on said frame below said head; pattern mounting means on said table; a pattern on said mounting means; a first hydraulic motor having a portion fixedly attached to said frame and a portion movable with respect to said frame; a valve mounted on said movable portion of said first motor having a tracing finger and a valve member responsive to deflection of said tracing finger, said first motor being connected to said valve, whereby, when said finger is deflected by said pattern, said movable portion of said first motor is moved to return said finger to its original position; adjustment means in the mount between said valve and said movable portion of said first motor whereby said valve and said tracing finger may be initially adjusted with respect to said pattern; a second hydraulic motor having a portion fixed to said frame and a movable portion secured to said contouring head to arcuately move said head, said first and second motors being connected directly to each other and said second motor being connected directly to said valve; and a source of hydraulic fluid under pressure and connected to said valve for delivery to either of said motors.

4. In a device for forming contours in a work piece, the combination of: a mounting frame; a contouring head mounted for arcuate movement on said frame; a longitudinally movable work piece supporting table on said frame below said head; pattern mounting means on said table; a pattern on said mounting means; a tracing finger engageable with said pattern; a valve connected to said tracing finger having a valve member responsive to movement of said finger; a source of pressure fluid; a first hydraulic motor fixedly secured to said frame having a movable portion bearing a mount to which said valve is secured, said first hydraulic motor being connected at one side to said valve; and a second hydraulic motor fixed to said frame adjacent said head and having a movable portion connected to said head to arcuately rotate the same, said second motor being connected in series with said first motor and, in turn, connected to said valve.

5. In a device for forming contours in a work piece, the combination of: a mounting frame; a contouring head mounted for arcuate movement on said frame; a longitudinally movable work piece supporting table on said frame below said head; pattern mounting means on said table; a pattern on said mounting means; a tracing finger engageable with said pattern; a valve connected to said tracing finger having a valve member responsive to movement of said finger; a source of pressure fluid; a first hydraulic motor fixedly secured to said frame having a movable portion bearing a mount to which said valve is secured, said first hydraulic motor being connected at one side to said valve; a second hydraulic motor fixed to said frame adjacent said head and having a movable portion connected to said head to arcuately rotate the same, said second motor being connected in series with said first motor and, in turn, connected to said valve; and adjustment means in said mount between said valve and the movable portion of said first motor whereby initial adjustment of said valve with respect to said mount is achieved.

References Cited in the file of this patent
UNITED STATES PATENTS

| | | |
|---|---|---|
| 2,341,194 | Schwartz et al. | Feb. 8, 1944 |
| 2,674,160 | Martellotti | Apr. 6, 1954 |
| 2,723,598 | Mann | Nov. 15, 1955 |
| 2,735,342 | Glaser | Feb. 21, 1956 |
| 2,743,584 | Rosebrook | May 1, 1956 |
| 2,753,244 | Dubosclard | July 3, 1956 |